W. C. OSTERHOLM.
METAL BUSHING AND METHOD OF FORMING SAME.
APPLICATION FILED JULY 26, 1915.
1,213,684.
Patented Jan. 23, 1917.
2 SHEETS—SHEET 2.
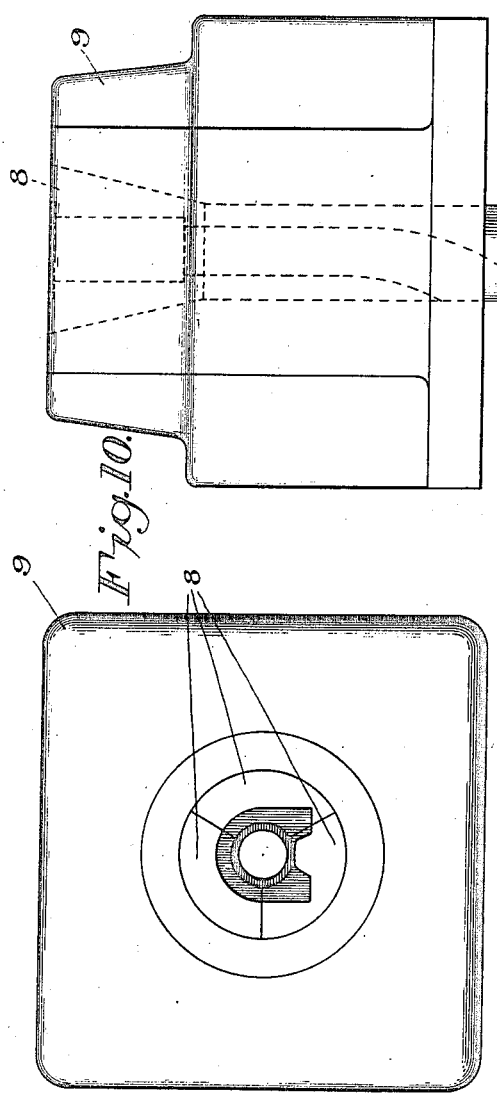
Inventor.
William C. Osterholm,
By Chas. E. Lord
Atty.

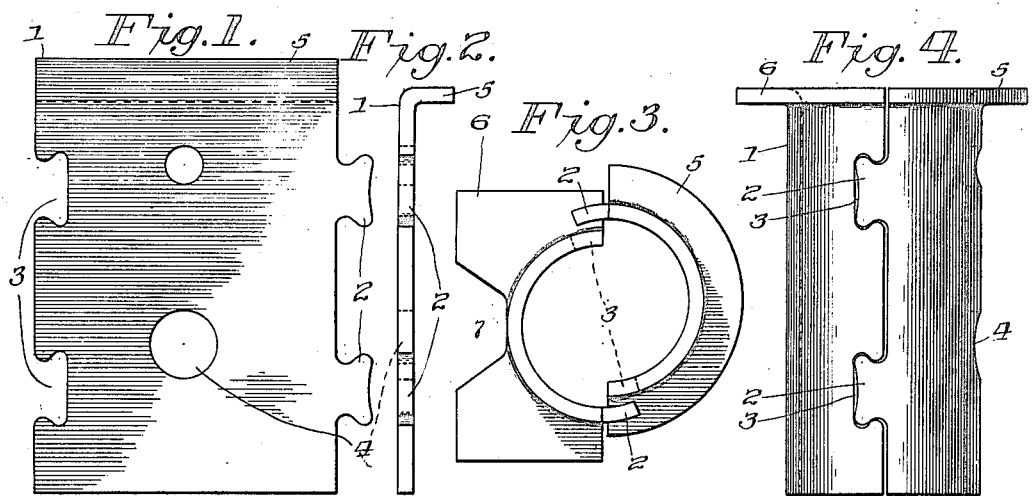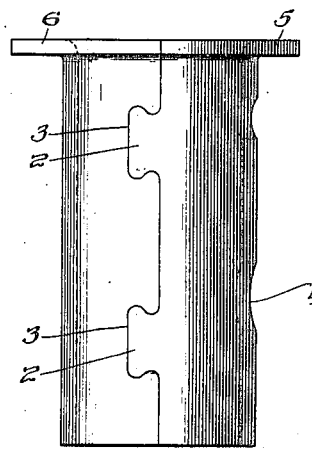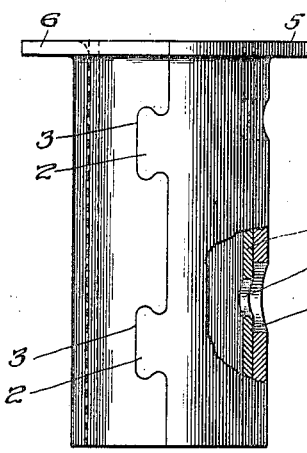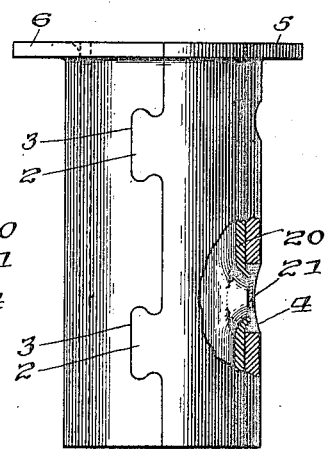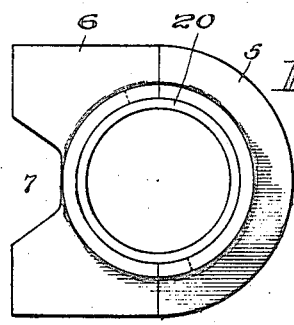

UNITED STATES PATENT OFFICE.

WILLIAM C. OSTERHOLM, OF CHICAGO, ILLINOIS, ASSIGNOR TO INTERNATIONAL HARVESTER COMPANY OF NEW JERSEY, A CORPORATION OF NEW JERSEY.

METAL BUSHING AND METHOD OF FORMING SAME.

1,213,684. Specification of Letters Patent. Patented Jan. 23, 1917.

Application filed July 26, 1915. Serial No. 41,966.

*To all whom it may concern:*

Be it known that I, WILLIAM C. OSTERHOLM, a citizen of the United States, residing at Chicago, in the county of Cook and State of Illinois, have invented certain new and useful Improvements in Metal Bushings and Methods of Forming Same, of which the following is a full, clear, and exact specification.

This invention relates to metal bushings, and in particular to an improved method of forming the prepared blanks into finished tubular shells having accurate dimensions in any desired form, and also to a method of preparing shells for the reception of a supplemental bearing shell, and to a method of forcing the supplemental shell into engagement with the prepared shell in a manner to rigidly secure it therein.

The objects of the invention are to improve the method of manufacturing metal bushings, reduce the cost thereof, and provide a simple bushing accurate in finished sizing and possessing a high degree of efficiency. These objects are attained by means of the method of manufacture as illustrated in the accompanying drawings, in which—

Figure 1 is a prepared blank of sheet metal having a preferred form; Fig. 2 is a side elevation of Fig. 1, having one end of the blank turned outward to form a flange; Fig. 3 is an end elevation of a pair of bushing members partially formed and in the process of assemblage; Fig. 4 is a side elevation of the members shown in Fig. 3 as being completely assembled; Fig. 5 is a side elevation of the finished shell and illustrating the product of a step by step method of manufacture after the members have been assembled; Fig. 6 is a side elevation, partly in section, of a bushing having a supplemental bearing shell inserted therein; Fig. 7 is an end elevation of Fig. 6; Fig. 8 is a side elevation, partly in section, of a bushing showing the result of another step in the method, being the method of securing the supplemental shell in position; Fig. 9 is a top plan view of part of a die mechanism used in connection with a power press and operative as one element of a bushing former; Fig. 10 is a side elevation of Fig. 9; Fig. 11 is a plan view of a shell forming drift; Fig. 12 is an end elevation of Fig. 11; Fig. 13 is a plan view of the shell rifling tool; Fig. 14 is an end elevation of Fig. 13; Fig. 15 is a plan view of a shell expanding and finishing tool; and Fig. 16 is an end elevation of Fig. 15.

Referring to the drawings, wherein the same reference characters designate like parts throughout the several views, 1 represents a blank cut from a strip of sheet metal, having spaced tongue members 2 at one edge and corresponding gaps 3 in its opposite edge, the contour of the gaps and tongues being such that when two of the blanks are brought together the tongues of one will be received by the gaps in the other in an interlocking manner along their length with their edges in close contact, as shown in Fig. 4. Simultaneously with the cutting operation, or separately if preferred, one or more openings 4 are punched in the body of the blanks and one end turned at right angles, forming a laterally disposed flange 5. The blank is then pressed to a semi-cylindrical form, as shown at the right in Fig. 3. In the tubular member, as shown, the two blanks are identical as to form excepting that one of them, as shown at the left in Fig. 3, is preferably provided with an angular flange 6, having a gap 7 centrally disposed for the purpose of securing the bushing against angular movement in the particular bearing of which it forms a part. After the two blanks have been shaped, as shown in Fig. 3, and assembled, as shown in Fig. 4, in a single tubular unit, they are placed between radially moving jaws 8 that are carried by a die supporting block 9 that forms part of an attachment that may be connected with any standard power press, the forming jaws being actuated by any approved means, as by air or hydraulic pressure controlled by the operator, and are thereby caused to move inward in a manner to cause the tubular member to assume a true cylindrical form, having a predetermined diameter and length, as the press head and die block engage with the opposite ends of the bushing at the same time as the forming jaws are moved together.

The next step in the method is to force a drift 10 longitudinally through the shell, the drift being preferably provided with a shank portion 11 whereby it may be connected with the press head, and a series of conical notches or collars 12 at its opposite end that, in passing through the shell, force the metal against the forming jaws, bringing the parts of the shell into close engagement and giving its interior a true and finished surface, the bushing having accurate dimensions. If it be desired to provide the bushing with a lining, any preferred metal alloy, such as brass, may be used. 13 represents a rifling tool having a shank 14 at one end and a series of spaced collars 15 at its opposite end that are provided with teeth 16 that form longitudinally disposed grooves upon the interior wall of the bushing as the rifling tool is forced through it, or the rifling tool and drift may be contained in one member. The sheet metal is then inserted in the bushing, being held against rotation therein by the rifling, and a sizing metal forcing drift 17 is pressed through the shell, the drift being provided with a shank 18 at one end that may be received by the moving head of the press, and a series of spaced collars 19 at its opposite end that have a larger diameter than the bore of the shell and operate to expand and force the exterior surface of the shell into close engagement with the rifled interior surface of the bushing and produce an accurate and finished bore through the shell, as shown in Fig. 6. The interior shell 20 is provided with openings 21 through its wall that register with openings in the wall of the bushing, and the metal surrounding one or more of the openings may be turned outward into the openings through the wall of the bushing, as shown in Fig. 8, by any preferred means.

There may be modifications in the method of producing these bushings, and it is my intention to cover all such modifications which do not depart from the spirit and scope of my invention as set forth in the appended claims.

What I claim as my invention, and desire to secure by Letters Patent, is:

1. The method of forming bushings from prepared blanks of sheet metal having interlockable tongues and gaps upon their opposite edges, consisting in first pressing the blanks into semi-cylindrical form, assembling them in tubular form with their meeting edges interlocking, subjecting the assembled members to an external pressure, and passing a sizing and finishing drift through its bore.

2. The method of forming bushings from prepared blanks of sheet metal having interlockable tongues and gaps upon their opposite edges, consisting in first pressing the blanks into semi-cylindrical form, assembling them in tubular form with their meeting edges interlocking, subjecting the assembled members to external side and end pressure, and passing a sizing and finishing drift through its bore.

3. The method of forming bushings from prepared blanks of sheet metal having interlockable tongues and gaps upon their opposite edges, consisting in first pressing the blanks into semi-cylindrical form, assembling them in tubular form with their meeting edges interlocking, subjecting the assembled members to external pressure, inserting a shell of metal alloy within the tubular member, and passing a shell expanding and finishing drift through its bore.

4. The method of forming bushings from prepared blanks of sheet metal having interlockable tongues and gaps upon their opposite edges, consisting in first pressing the blanks into semi-cylindrical form, assembling them in tubular form with their meeting edges interlocking, subjecting the assembled members to external pressure, passing a sizing and finishing drift through its bore, inserting a shell of metal alloy within the tubular member, and passing a shell expanding and finishing drift through its bore.

5. The method of forming bushings from prepared blanks of sheet metal having interlocking tongues and gaps upon their opposite edges, consisting in first pressing the blanks into semi-cylindrical form, assembling them in tubular form with their meeting edges interlocking, subjecting the assembled members to external pressure, passing a sizing and rifling drift through its bore, inserting a shell of metal alloy within the rifled member, and passing an expanding and finishing drift through its bore.

6. The method of forming bushings from prepared blanks of sheet metal having interlockable portions, consisting in first changing the blanks into semi-cylindrical form, assembling them in tubular form in interlocking engagement, and inserting a shell within the tubular member.

7. In a bushing, the combination of a tubular member formed of sheet material having interlocking portions, and a shell having a driving fit within said tubular member supporting said member against collapse at the interlocking portions.

8. In a bushing, the combination of a tubular member formed of sheet material having interlocking portions, and a shell within said tubular member supporting said member against collapse at the interlocking portions.

9. In a bushing, the combination of a tubular structure formed of semi-cylindrical pieces of sheet material having their edges in interlocking engagement, and a shell within said tubular structure supporting same against collapse at the interlocking portions.

In testimony whereof I affix my signature.

WILLIAM C. OSTERHOLM.